US00RE38142E

(19) United States
(12) Reissued Patent
Berry et al.

(10) Patent Number: US RE38,142 E
(45) Date of Reissued Patent: Jun. 10, 2003

(54) LOW COST HYBRID VIDEO DISTRIBUTION SYSTEM FOR AIRCRAFT IN-FLIGHT ENTERTAINMENT SYSTEMS

(75) Inventors: Dickie J. Berry, La Verne, CA (US); Lawrence E. Girard, Westminster, CA (US); Richard E. Sklar, Huntington Beach, CA (US)

(73) Assignee: Rockwell Collins, Inc., Cedar Rapids, IA (US)

(21) Appl. No.: 09/663,142

(22) Filed: Sep. 15, 2000

Related U.S. Patent Documents

Reissue of:
(64) Patent No.: 5,929,895
Issued: Jul. 27, 1999
Appl. No.: 08/757,721
Filed: Nov. 27, 1996

(51) Int. Cl.[7] ..... H04N 7/173
(52) U.S. Cl. ..... 725/77; 725/76
(58) Field of Search ..... 725/77, 76, 75; H04N 7/173

(56) References Cited

U.S. PATENT DOCUMENTS 4,835,604 A * 5/1989 Kondo ..... 725/76
4,887,152 A * 12/1989 Matsuzaki ..... 725/76

OTHER PUBLICATIONS

Jim Williams, "Airborne Satellite Television", Avion Magazine, Fourth Quarter, 1994, pp. 43–45, 48, 50–52, 54.
Jim Williams, "MPEG—The Great Enabler", Avion Magazine, Fourth Quarter, 1994, pp. 48, 50–52, 54.

* cited by examiner

*Primary Examiner*—Sherrie Hsia
(74) *Attorney, Agent, or Firm*—Nathan O. Jensen; Kyle Eppele

(57) ABSTRACT

An aircraft entertainment system employing a hybrid video distribution system that permits distribution of direct broadcast satellite television programming to passengers of the aircraft. The aircraft entertainment system has a video control center 11, a plurality of groups of set display units 40, and a plurality of audio and video processors 20 that control routing of programming to each seat display unit. A plurality of seat junction boxes 30 may be interposed between the audio and video processors 20 and the groups of seat display units 40. An antenna 12 is receives programming from a satellite, and a splitter 13 generates a plurality of channels of programming received by the antenna 12. A decoder 14 decodes the channels to provide video and audio signals, and an RF modulator 16 modulates the decoded audio and video signals for distribution. Each seat display unit 40 has a keypad 44 for selecting channels and controlling audio volume, a logic circuit 45 for outputting channel addresses of the selected channels, an address decoder 47 for decoding the channel addresses, and a channel display 46 for displaying the number of the selected channel. A video display 53 displays the television programming, and an audio output device reproduces the audio signals. The audio and video processors 20 convert the modulated RF video signals to baseband video for distribution to the seat display units 40. Each processor comprises a plurality of tuners 25, and non-blocking audio crosspoint switches 26, 27 having a predetermined number of audio and video outputs that are a selected multiple of the number of inputs. A processor 28 is coupled to the audio and video crosspoint switches and to the address decoder of each seat display unit for processing the decoded channel addresses and selecting which channels are output to each seat display unit.

23 Claims, 3 Drawing Sheets

30

LOW COST HYBRID VIDEO DISTRIBUTION SYSTEM FOR AIRCRAFT IN-FLIGHT ENTERTAINMENT SYSTEMS

Matter enclosed in heavy brackets [ ] appears in the original patent but forms no part of this reissue specification; matter printed in italics indicates the additions made by reissue.

BACKGROUND

The present invention relates generally to in-flight aircraft entertainment systems, and more particularly, to a low cost, hybrid video distribution system for use with in-flight aircraft entertainment systems.

The assignee of the present invention designs and manufactures in-flight entertainment systems for aircraft, and the like. Heretofore, full cable television (CATV) type radio frequency (RF) distribution systems have been used in most aircraft in-flight aircraft entertainment systems. These cable television type RAF distribution systems require a tuner at every seat. The cost of tuners is relatively high, and because of the large number of seats and associated tuners, the overall cost of prior distribution systems has been high.

It would therefore be desirable to have an alternative in-flight entertainment system that does not replace the full RF system, but provides a low cost system for use in commercial aircraft, and particularly in narrow body commercial aircraft. Such a low cost -flight entertainment system would make video sources such as DIRECTTV satellite broadcasts, for example, a viable option on short haul aircraft flying routes within the continental United States.

Accordingly, it is an objective of the present invention to provide for a video distribution system for use with in-flight aircraft entertainment systems. It is a further objective of the present invention to provide for a hybrid video distribution system that permits distribution of direct broadcast satellite programming to passengers on short haul aircraft flying routes within the continental United States.

SUMMARY OF THE INVENTION

To meet the above and other objectives, the present invention provides for an architecture for a low cost in-flight aircraft entertainment (video and audio) distribution system that supports reception of satellite broadcasts from a direct broadcast satellite source, such as from DIRECTTV satellites, for example, along with other video programming, such as video tapes, and laser disks, and the like. The present video distribution system thus distributes video derived from a wide variety of video sources to passengers of an aircraft.

The in-flight aircraft entertainment system comprises a video control center, a plurality of groups of seat display units, and a plurality of audio and video processors that control routing of video channels to each respective seat display unit. A plurality of seat junction boxes may be interposed between the plurality of audio and video processors and the plurality of groups of seat display units to simplify interconnection of these components.

The video control center includes an antenna for receiving programming broadcast from a direct broadcast satellite, and a splitter for generatING a plurality of channels of programming received by the antenna. A decoder decodes the channels to provide video and audio signals for distribution. An RF modulator modulates the decoded audio and video signals.

Each seat display unit comprises a keypad for selecting channels and controlling the volume of the audio signals for the selected channels, a logic circuit for outputting channel addresses corresponding to the selected channels, an address decoder for decoding the channel addresses, and a channel display for displaying the number of the selected channel. A video display is provided for processing the video signals to display the selected channel, and an audio output device is provided for reproducing the audio signals for each of the channels.

The plurality of audio and video processors convert the modulated RF video signals to baseband video for distribution to each of the seat display units. Each of the processors comprise a plurality of tuners, and non-blocking audio crosspoint switches having a predetermined number of audio and video outputs that are a selected multiple of the number of inputs. A processor is coupled to the audio and video crosspoint switches and coupled to the address decoder of each of the seat display units for receiving the decoded channel addresses and for selecting which channels are output to each seat display unit 40 in response thereto.

The in-flight aircraft entertainment distribution system distributes audio and video without requiring a tuner at every seat. In the in-flight aircraft entertainment distribution system, one tuner is provided for each video program that is used to service a predetermined large number of seats. In a reduced-to-practice embodiment of the resent invention, one tuner is provided for a group of 48 seats. Distribution of video programs is handled in an area video processor as requested on a serial communications link from a seat display unit serving each seat.

In the case of an eight video program (eight tuners) system, for example, the quantity of tuners required for the system is reduced from 48 to 8. At approximately $150 per tuner, $6600 per group of 48 seats is saved using the present invention. On a 747–400 aircraft having 400 seats, for example, this represents a savings of $55,000 in the cost of the system. The present invention removes the tuner from the seatback, allowing larger displays to be installed, while reducing the power requirements of the system. Due to the reduction in the number of components, the mean time between failure (MTBF) of the system increases, thus reducing service costs.

The present system was originally developed to permit the display of direct satellite broadcasts on narrow body aircraft. However, the present video and audio distribution system provides a low cost distribution solution with or without the ability to distribute direct broadcast satellite programming. Signals from any video or audio source may be inexpensively distributed throughout the cabin of an aircraft using the present system.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
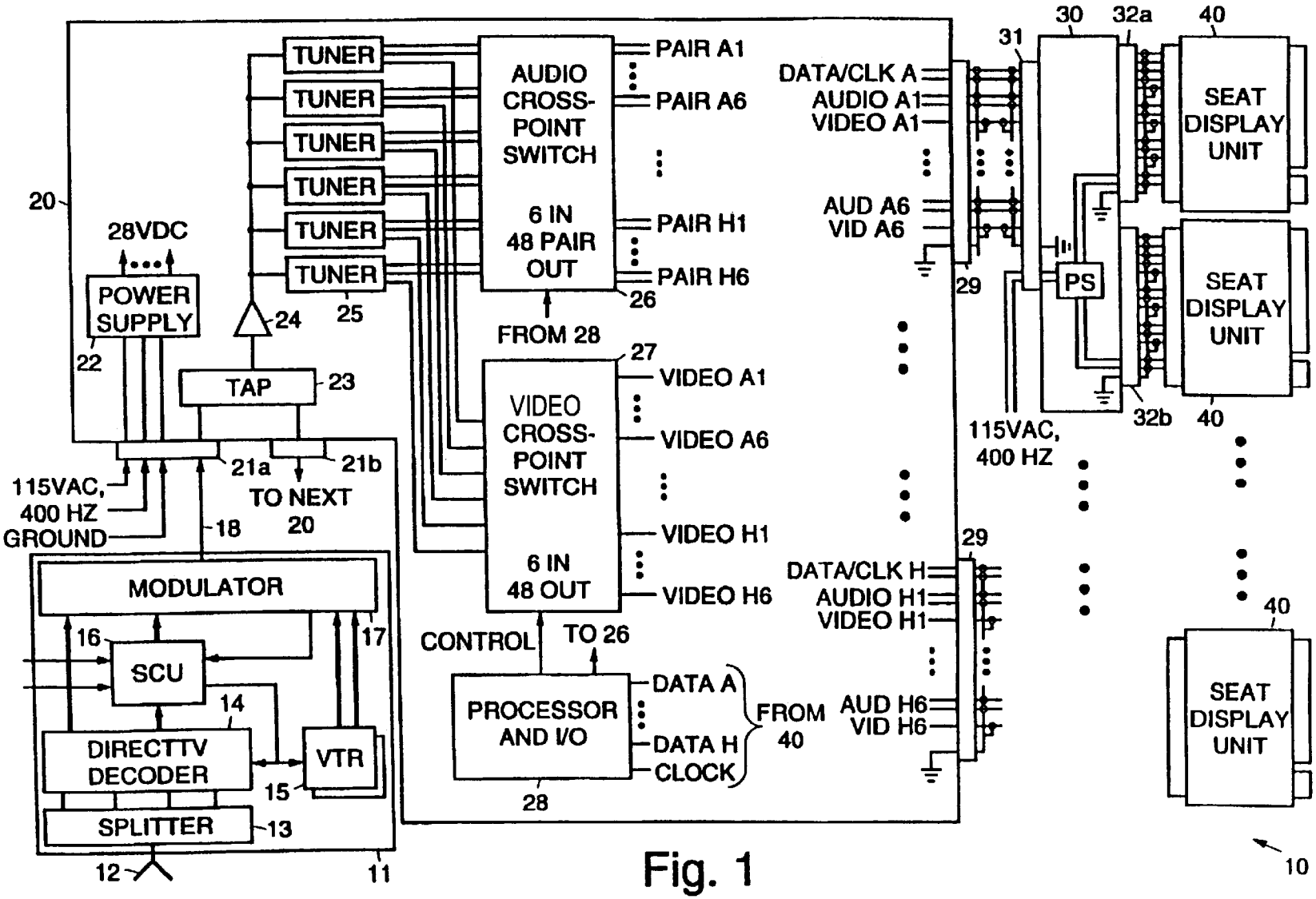
FIG. 1 is a system block diagram illustrating an embodiment of a hybrid in-flight audio and video distribution system in accordance with the principles of the present invention.

Referring to the drawing figures, FIG. 1 illustrates one embodiment of a hybrid in-flight audio and video distribution system 10 in accordance with the principles of the present invention. The in-flight audio and video distribution system 10 comprises a video control center 11 that is designed to output a variety of video and audio signals for distribution to passengers of an aircraft. For example, a video tape recorder (VTR) 15 can be used to provide prerecorded programming on video tapes. The video control center 11 has a splitter 13 that is coupled to an antenna 12 that receives programming broadcast from a direct broadcast satellite such as from satellites of the DIRECTTV satellite system, for example. The antenna 12 is coupled by way of the splitter 13 to a DirectTV decoder 14. The splitter 13 that splits off a plurality of channels of programming which are each decoded by the decoder 14. Outputs of the decoder 14 include video and audio signals for each of the channels. The video signals are coupled to a system control unit (SCU) 16 which provides an operator and airframe interface to the video distribution system 10. The output signals from the SCU 16 are coupled to an RF modulator 17. The RF modulator 17 modulates the audio and video signals contained in the decoded video channels. The modulated audio and video signals are coupled to an audio and video processor 20 in accordance with the principles of the present invention which processes the signals and routes them by way of a plurality of seat junction boxes 30 to a plurality of seat display units 40.

Video sources in the video control center 11, also known as head end equipment 11, are modulated onto a single coax cable 18 by the RF modulator 17. This CATV-type video signal is routed to the audio and video processor 20, where it is converted to baseband video for distribution to the seat displays. The audio and video processor 20 comprises a plurality of input connectors 21a, 21b, wherein the first connector 21a is coupled to receive 115 VAC, 400 Hz power for the power supply 22 and wherein the second connector 21b is coupled to the next audio and video processor 20 of the system 10.

The audio and video processor 20 comprises a plurality of tuners 25, one tuner 25 for each video program decoded by the decoder 14. In the embodiment of the system 10 shown in FIG. 1, six tuners 25 are employed in the audio and video processor 20 to route programming to forty-eight seat display units. The modulated RF video signal is coupled by way of a tap 23 and a video amplifier 24 to each of the tuners 25. The modulated RF video signal is also coupled by way of the tap 23 to the next audio and video processor 20 in the chain via the second connector 21b.

Each of the respective tuners 25 have a pair of audio outputs and a video output respectively coupled to inputs of non-blocking audio and video crosspoint switches 26, 27. The non-blocking audio and video crosspoint switches 26, 27 select which program is sent to a particular seat display unit 40. This is controlled by RS-485 data originating at the seat display unit, which will be discussed with reference to FIG. 3. The RS-485 data is input to a processor 28 that outputs control signals to the non-blocking audio and video crosspoint switches 26, 27 to select which program is sent to each seat display unit 40.

The audio crosspoint switch 26 has six sets of audio inputs and forty-eight pairs of audio outputs. The video crosspoint switch 27 has six sets of video inputs and forty-eight video outputs. Audio and video output signals from the audio and video crosspoint switches 26, 27 are routed by way of output connectors 29 on the audio and video processor 20 to a plurality of seat junction boxes 30.

Figure 2:
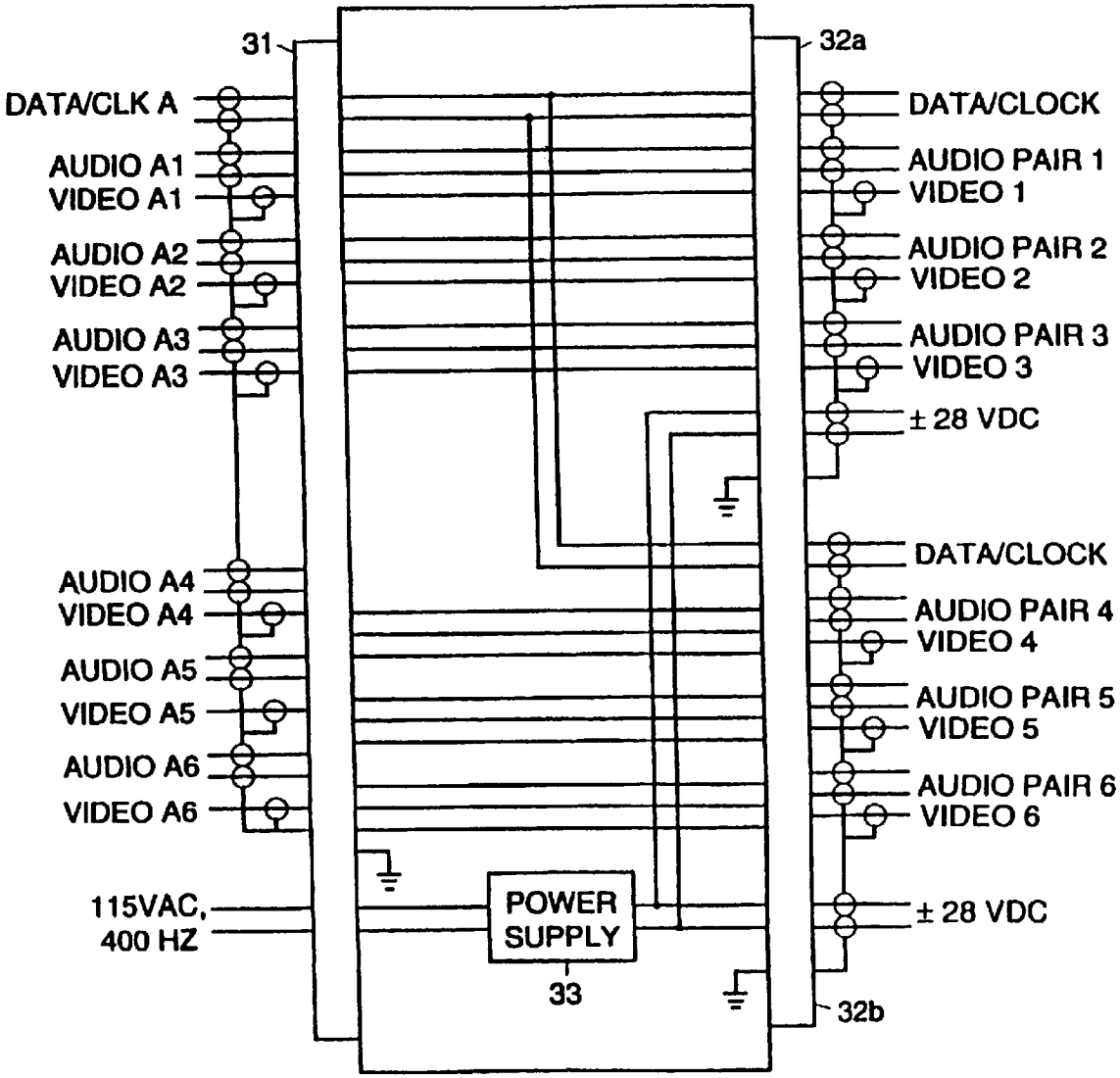
FIG. 2 illustrates details of a seat junction box used in the system of FIG. 1.

FIG. 2 illustrates details of the seat junction box 30 used in the system of FIG. 1. Each of the seat junction boxes 30 processes six sets of audio and video input signals received by way of an input connector 31 and outputs the first three sets of audio and video output signals by way of a first output connector 32a, and outputs the second three sets of audio and video output signals by way of a second output connector 32b. Each of the seat junction boxes 30 contains a power supply 33 that converts 115 VAC, 400 Hz power into ±28 volt DC power to drive the seat display units 40.

Figure 3:
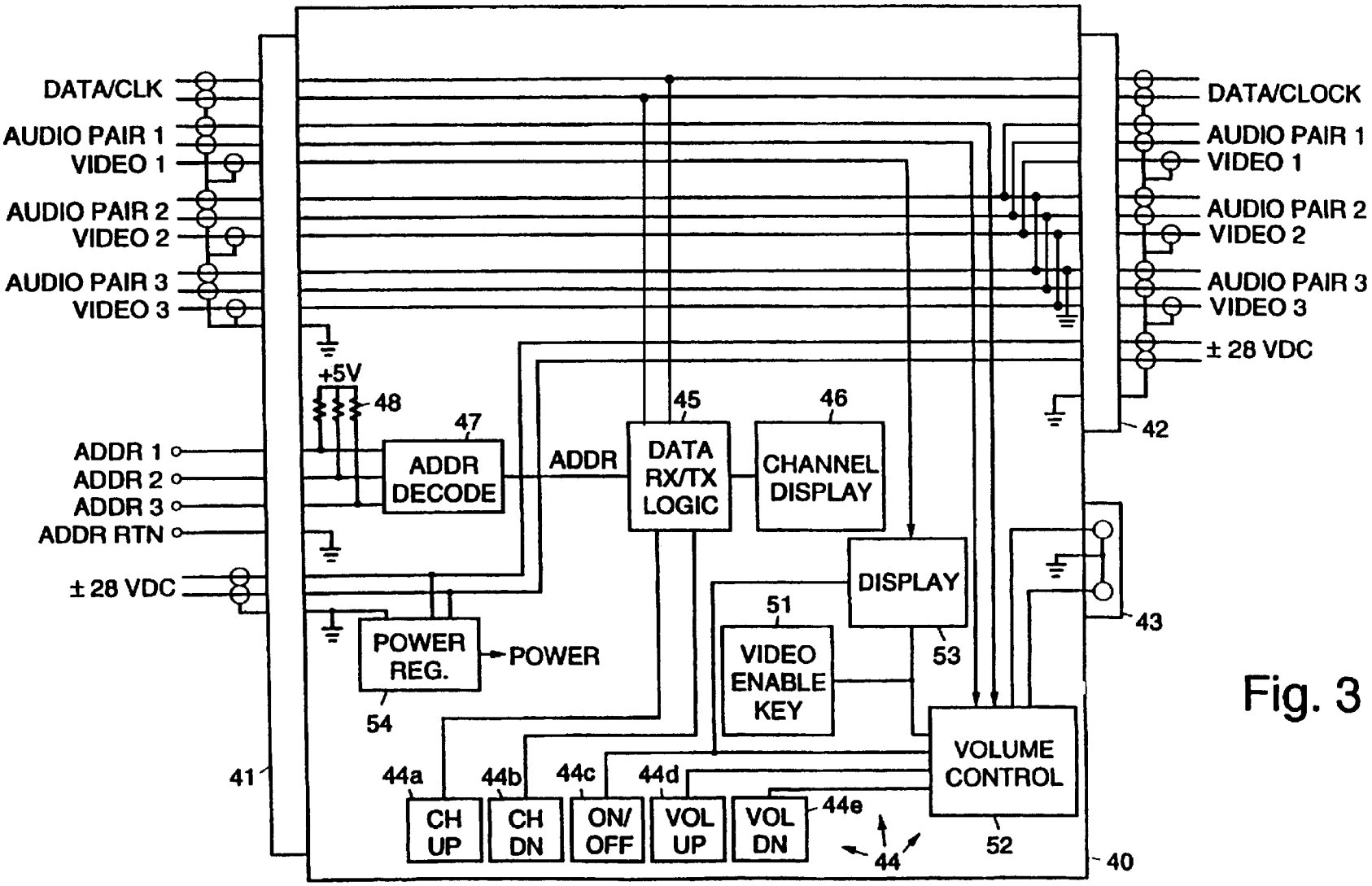
FIG. 3 illustrates details of a seat display unit used in the system of FIG. 1.

FIG. 3 illustrates details of the seat display unit 40 used in the system of FIG. 1. The seat display unit 40 has an input connector 41 that is coupled to the output connector 32a, for example, of the seat junction box 30. The input connector 41 receives the three sets of audio and video output signals and ±28 volt DC power from the seat junction box 30. The RS-485 data is routed by way of the input connector 41 to the processor 28 of the audio and video processor 20. An output connector 42 is used to pass through the three sets of audio and video output signals and the ±28 volt DC power to an adjacent seat display unit 40. An audio jack 43 is provided for connection to passenger headphones.

The seat display unit 40 comprises a keypad 44 comprising a plurality of switches that include a channel up switch 44a, a channel down switch 44b, an on/off switch 44c, a volume up switch 44d, and a volume down switch 44e. The channel up and channel down switches 44a, 44b are coupled to data receive and transmit logic 45. The data receive and transmit logic 45 outputs channel addresses (ADDR) for the appropriate programming channel selected by the passenger. The data receive and transmit logic 45 is coupled to a channel display 46 which displays the selected channel to the passenger, and to an address decoder 47 whose output lines are coupled to a +5 volt DC source by way of a plurality of resistors 48 to properly set the voltage level of the decoded address transmitted to the processor 28 in the audio and video processor 20.

A video enable key 51 is provided that is coupled to a volume control circuit 52 and a video display 53 which is used to activate them. A 5 inch LCD seat display 53 is used in the reduced to practice embodiment of the system 10. The volume up and volume down switches 44d, 44e are coupled to the volume control circuit 52. The on/off switch 44c and is coupled to the volume control circuit 52 and to the video display 53 to turn them on and off. The volume control circuit 52 is coupled to the audio jack 43 and couples audio signals thereto that may be used to drive a set of headphones.

A power regulator 54 is coupled to the ±28 volt DC lines and provides regulated power to components of the seat display unit 40 that require regulated power. These components include the data receive and transmit logic 45, the channel display 46, the address decoder 47, the volume control circuit 52 and the display 53.

In operation, channels are selected by a passenger using the keypad 44. Seat identification is accomplished by wiring in the cable coupled to the seat display unit 40 identified by addressed ADDR1-ADDR3. Seat display units 40 are grouped in sets of three. By routing the audio and video signals from two to one and three to two in every seat display unit 40, the proper signals do not need to be switched in the seat display unit 40. This enables the seat display units 40 to occupy any of three relative positions in a seat group without requiring special configuration. DC power is provided to the seat display unit 40 via the power supply 33 in the seat junction box 30. The seat junction box 30 also serves as a cable junction and disconnect box.

In the reduced to practice embodiment of the present system 10, there is no interface to other aircraft systems, such as passenger service systems or existing audio entertainment systems. The present system 10 provides for a hybrid system 10 containing both RF and baseband processing that takes advantage of RF distribution throughout the aircraft and baseband distribution within an area provided by respective audio and video processor 20 to a predetermined number of seat display units 40. In the reduced to practice embodiment of the system 10, the number of video channels can range from 2 to 6, with each channel providing one stereo pair or two monoaural languages.

The reduced to practice embodiment of the in-flight audio and video distribution system 10, each audio and video processor 20 receives a composite analog video signal that has been modulated using a single RF carrier. The system 10 provides control for up to eight channels of video programming each with an associated stereo audio pair (or two monoaural languages). The RF signal is routed to the audio and video processor 20 for distribution to up to 48 seats. The audio and video processor 20 contains up to eight tuners 25, one for each channel. The tuner 25 output is routed through the non-blocking audio and video crosspoint switches 26, 27 that have the capability to switch any one of the weight tuner outputs to any one of the 48 seat outputs. In addition to the tuner 25 and the audio and video crosspoint switches 26, 27 in the audio and video processor 20 provide a serial control interface to the seat display units 40 along with appropriate video and audio amplifiers.

The video, audio and data signals are routed through the seat junction box 30 that provides power to up to six seat display units 40. The seat junction box 30 communicates with the audio and video processor 20 through the RS-485 serial interface and polls the seat display units 40 for video control switch processing. The junction box 30 provided power to the seat display units 40 and a also provides a means to interconnect the audio and video processor 20 to the seat display units 40.

Thus, a hybrid video distribution system for use with in-flight aircraft entertainment systems has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An in-flight aircraft entertainment video distribution system comprising:

a video control center comprising:

an antenna for receiving programming broadcast from a direct broadcast satellite;

a splitter coupled to the antenna for splitting off a plurality of channels of programming received by the antenna;

a decoder for decoding the plurality of channels of programming and for providing video and audio signals for each of the channels;

a system control unit which provides an operator and airframe interface to the video distribution system; and an RF modulator for modulating the audio and video signals of the decoded channels;

a plurality of groups of seat display units, wherein each seat display unit comprises:

a keypad having a plurality of switches for selecting the channels and controlling the volume of the audio signals for the selected channels;

a logic circuit for outputting channel addresses corresponding to the selected channels;

an address decoder coupled to the logic circuit for decoding the channel addresses[:]*;* a channel display coupled to the logic circuit for displaying the number of the selected [channel:] *channels;* a video display for processing the video signals to display the selected [channel] *channels*; and an audio output jack for providing the audio signals for each of the channels to passenger headphones; and a plurality of audio and video processors coupled between the RF modulator and respective ones of the seat display units, for converting the modulated RF video signals to baseband video for distribution to each of the seat display units, wherein each of said processors comprise:

a plurality of tuners comprising one tuner for each channel decoded by the decoder;

a non-blocking audio crosspoint switch having inputs that are coupled to each of the tuners and having a predetermined number of audio outputs that are a selected multiple of the number of inputs;

a non-blocking video crosspoint switch having inputs that are coupled to each of the tuners and having a predetermined number of video outputs that are the selected multiple of the number of inputs; and a processor coupled to the non-blocking audio and video crosspoint switches and coupled to the address decoder of each of the seat display units for receiving the decoded channel addresses and for selecting which channels are output to each seat display unit in response thereto.

2. The system of claim 1 further comprising:

a plurality of seat junction boxes interposed between the plurality of audio and video processors and the plurality of groups of seat display units for receiving a predetermined plurality of sets of audio and video input signals and for outputting a first subset of the sets of audio and video output signals to a first group of seat display units, and for outputting a second subset of the sets of audio and video output signals to a second group of seat display units.

3. The system of claim 1 wherein the keypad includes a channel up switch, a channel down switch, an on/off switch, a volume up switch, and a volume down switch.

4. The system of claim 3 further comprising a volume control circuit for controlling the volume of the audio signals provided by the audio output jack to a set of headphones.

5. The system of claim 4 further comprising a video enable key coupled to the volume control circuit and the video display for enabling them.

6. The system of claim 4 wherein the volume up and volume down switches are coupled to the volume control circuit.

7. The system of claim 4 wherein the on/off switch is coupled to the volume control circuit and to the video display to turn them on and off.

8. A video distribution system for use with an in-flight aircraft entertainment system that provides modulated audio and video signals corresponding to a plurality of video channels decoded by a direct broadcast satellite TV decoder, said video distribution system comprising:

a plurality of groups of seat display units, wherein each seat display unit comprises:

a keypad having a plurality of switches for selecting channels and controlling the volume of the audio signals for the selected channels;

a logic circuit for outputting channel addresses corresponding to the selected channels;

an address decoder coupled to the logic circuit for decoding the channel addresses;

a channel display coupled to the logic circuit for displaying the number of the selected [channel; and] *channels;* a video display for processing the video signals to display the selected [channel] *channels*; and an audio output jack for providing the audio output signals for each of the channels; and a plurality of audio and video processors coupled between an RF modulator and respective ones of the seat display units, for converting the modulated signals to baseband video for distribution to each of the seat display units, wherein each of said processors comprise:

a plurality of tuners comprising one tuner for each channel decoded by the direct broadcast satellite TV decoder;

a non-blocking audio crosspoint switch having inputs that are coupled to each of the tuners and having a predetermined number of audio outputs that are a selected multiple of the number of inputs;

a non-blocking video crosspoint switch having inputs that are coupled to each of the tuners and having a predetermined number of video outputs that are the selected multiple of the number of inputs; and a processor coupled to the non-blocking audio and video crosspoint switches and coupled to the address decoder of each of the seat display units for receiving the decoded channel addresses and for selecting which channels are output to each seat display unit in response thereto.

9. The system of claim 8 further comprising:

a plurality of seat junction boxes interposed between the plurality of audio and video processors and the plurality of groups of seat display units for receiving a predetermined plurality of sets of audio and video input signals and for outputting a first subset of the sets of audio and video output signals to a first group of seat display units, and for outputting a second subset of the sets of audio and video output signals to a second group of seat display units.

10. The system of claim 9 wherein the keypad includes a channel up switch, a channel down switch, an on/off switch, a volume up switch, and a volume down switch.

11. The system of claim 10 further comprising a volume control circuit for controlling the volume of the audio signals provided by the audio output jack to a set of headphones.

12. The system of claim 11 further comprising a video enable key coupled to the volume control circuit and the video display for enabling them.

13. The system of claim 11 wherein the volume up and volume down switches are coupled to the volume control circuit.

14. The system of claim 11 wherein the on/off switch is coupled to the volume control circuit and to the video display to turn them on and off.

15. A video distribution system for use with an in-flight aircraft entertainment system that provides modulated audio and video signals corresponding to a plurality of video channels decoded by a direct broadcast satellite TV decoder, said video distribution system comprising:

a plurality of groups of seat display units, wherein each seat display unit comprises:

a keypad having a plurality of switches for selecting channels and controlling the volume of the audio signals for the selected channels;

a logic circuit for outputting channel addresses corresponding to the selected channels;

an address decoder coupled to the logic circuit for decoding the channel addresses;

a channel display coupled to the logic circuit for displaying the number of the selected [channel] *channels*;

a video display for processing the video signals to display the selected [channel] *channels*; and an audio output jack for providing the audio output signals for each of the channels; and a plurality of audio and video processors coupled between an RF modulator and respective ones of the seat display units, for converting the modulated video signals to baseband video for distribution to each of the seat display units, wherein each of said processors comprise:

a plurality of tuners comprising one tuner for each channel decoded by the decoder;

a non-blocking audio crosspoint switch having inputs that are coupled to each of the tuners and having a predetermined number of audio outputs that are a selected multiple of the number of inputs;

a non-blocking video crosspoint switch having inputs that are coupled to each of the tuners and having a predetermined number of video outputs that are the selected multiple of the number of inputs; and a processor coupled to the non-blocking audio and video crosspoint switches and coupled to the address decoder of each of the seat display units for receiving the decoded channel addresses and for selecting which channels are output to each seat display unit in response thereto; and a plurality of seat junction boxes interposed between the plurality of audio and video processors and the plurality of groups of seat display units for receiving a predetermined plurality of sets of audio and video input signals and for outputting a first subset of the sets of audio and video output signals to a first group of seat display units, and for outputting a second subset of the sets of audio and video outputting signals to a second group of seat display units.

16. The system of claim 15 wherein the keypad includes a channel up switch, a channel down switch, an on/off switch, a volume up switch, and a volume down switch.

17. The system of claim 16 further comprising a volume control circuit for controlling the volume of the audio signals provided by the audio output jack to a set of headphones.

18. The system of claim 17 further comprising a video enable key coupled to the volume control circuit and the video display for enabling them.

19. The system of claim 17 wherein the volume up and volume down switches are coupled to the volume control circuit.

*20. An in-flight aircraft entertainment video distribution system comprising:*

*a video control center comprising:*

*an antenna for receiving programming broadcast from a satellite;*

*a splitter coupled to the antenna for splitting off a plurality of channels of programming received by the antenna;*

*a decoder for decoding the plurality of channels of programming and for providing video and audio signals for each of the channels;*

*a system control unit which provides an operator and airframe interface to the video distribution system; and*

*an RF modulator for modulating the audio and video signals of the decoded channels;*

*a plurality of groups of seat display units, wherein each seat display unit comprises:*

*a selector that selects the channels and that controls the volume of the audio signals for the selected channels;*

*a logic circuit that outputs channel addresses corresponding to the selected channels;*

*an address decoder coupled to the logic circuit and that decodes the channel addresses; and*

*a video display that processes the video signals to display the selected channels; and*

*a plurality of audio and video processors coupled between the RF modulator and respective ones of the seat display units, and that converts the modulated RF video signals to baseband video for distribution to each of the seat display units, wherein each of said processors comprise:*

*a plurality of tuners comprising one tuner for each channel decoded by the decoder; and*

*a processor coupled to the address decoder of each of the seat display units, that receives the decoded channel addresses and that selects which channels are output to each seat display unit in response thereto.*

*21. An in-flight aircraft entertainment video distribution system comprising:*

*a video control center comprising:*

*an antenna that receives programming broadcast from a satellite;*

*a splitter coupled to the antenna and that splits off a plurality of channels of programming received by the antenna;*

*a decoder that decodes the plurality of channels of programming and that provides video and audio signals for each of the channels;*

*a system control unit that provides an operator and airframe interface to the video distribution system; and*

*an RF modulator that modulates the audio and video signals of the decoded channels;*

*a plurality of groups of seat display units, wherein each seat display unit comprises:*

*a selector that selects the channels and that controls the volume of the audio signals for the selected channels;*

*a logic circuit that outputs channel addresses corresponding to the selected channels;*

*an address decoder coupled to the logic circuit, and that decodes the channel addresses;*

*a channel display coupled to the logic circuit, and that displays the number of the selected channels;*

*a video display that processes the video signals to display the selected channels; and*

*an audio output that provides the audio signals for each of the channels to passenger in audible form; and*

*a plurality of audio and video processors coupled between the RF modulator and respective ones of the seat display units, that converts the modulated RF video signals to baseband video for distribution to each of the seat display units.*

*22. An in-flight aircraft entertainment video distribution system comprising:*

*a video control center comprising:*

*an distribution system that receives and distributes a plurality of programming channels that include video and audio signals;*

*an RF modulator that modulates the audio and video signals;*

*a plurality of groups of seat display units, wherein each seat display unit comprises:*

*a selector that selects the channels and that controls the volume of the audio signals for the selected channels;*

*a logic circuit that outputs channel addresses corresponding to the selected channels;*

*an address decoder coupled to the logic circuit, and that decodes the channel addresses;*

*a channel display coupled to the logic circuit, and that displays the number of the selected channels;*

*a video display that processes the video signals to display the selected channels; and*

*an audio output that provides the audio signals for each of the channels to passenger in audible form; and*

*a plurality of audio and video processors coupled between the RF modulator and respective ones of the seat display units, that converts the modulated RF video signals to baseband video for distribution to each of the seat display units.*

*23. A plurality of seat display units, comprising:*

*a first seat display unit that receives a first plurality of programming channels via a plurality of pairs of audio and video lines, respectively, the plurally of pairs of audio and video lines being received on a respective plurality of audio and video input ports, the first seat display unit including a plurality of pairs of audio and video output ports for respectively outputting a second plurality of audio and video signals; and*

*a second seat display unit that receives the second plurality of audio and video signals respectively output from the plurality of pairs of audio and video output ports of the first seat display unit, the second plurality of audio and video signals being received on a respective plurality of audio and video input ports equal in number to those of the first seat display unit;*

*wherein the first seat display unit includes a processing unit that processes one of the first plurality of pairs of audio and video lines for providing a plurality of programming channels to a passenger at a seat at which the first seat display unit is provided;*

*wherein the one of the first plurality of pairs of audio and video lines are not provided to the second seat display unit; and*

*wherein all others of the first plurality of pairs of audio and video lines are provided to the second seat display unit.*

* * * * *